US012693511B2

(12) United States Patent
Amthor et al.

(10) Patent No.: US 12,693,511 B2
(45) Date of Patent: Jul. 28, 2026

(54) LIGHT MICROSCOPE WITH AUTOMATIC FOCUSING

(71) Applicant: Carl Zeiss Microscopy GmbH, Jena (DE)

(72) Inventors: Manuel Amthor, Jena (DE); Daniel Haase, Zöllnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/877,099

(22) Filed: May 18, 2020

(65) Prior Publication Data

US 2020/0371335 A1 Nov. 26, 2020

(30) Foreign Application Priority Data

May 21, 2019 (DE) .......................... 102019113540.0

(51) Int. Cl.
*G06T 7/13* (2017.01)
*G02B 21/24* (2006.01)
(Continued)

(52) U.S. Cl.
CPC .............. *G02B 21/244* (2013.01); *G06T 7/12* (2017.01); *G06T 7/13* (2017.01); *G06T 7/60* (2013.01); *G06T 7/73* (2017.01); *G06T 7/80* (2017.01); *H04N 23/676* (2023.01); *H04N 23/959* (2023.01); *G06T 2207/10056* (2013.01); *G06T 2207/10148* (2013.01);
(Continued)

(58) Field of Classification Search
CPC .. G02B 21/244; G02B 21/242; G02B 21/245; G02B 21/34; G06T 2207/10056; G06T 2207/10148; G06T 2207/20081; G06T 2207/20092; G06T 2207/20164; G06T 2207/30168; G06T 7/12; G06T 7/13; G06T 7/60; G06T 7/73; G06T 7/80; G06T 2207/10016; G06T 2207/20096; H04N 5/232125; H04N 5/232133; H04N 5/232123; H04N 5/232127; H04N 5/23229
USPC ......................................................... 348/79
See application file for complete search history.

(56) References Cited

U.S. PATENT DOCUMENTS 5,870,200 A * 2/1999 Berndt ................... G01B 11/06
356/632
7,345,814 B2 3/2008 Yoneyama et al.
(Continued)

FOREIGN PATENT DOCUMENTS

CN 101556373 A 10/2009
CN 102313982 A 1/2012
(Continued)

OTHER PUBLICATIONS

Winterfeldt, Carsten, Search Report for DE102019113540.0, Jul. 12, 2019, 7 pages (Englsih translation not available).
(Continued)

*Primary Examiner* — William C Vaughn, Jr.
(74) *Attorney, Agent, or Firm* — LaBatt, LLC

(57) ABSTRACT

In a method for automatically focusing a microscope, an overview image that shows a sample and an environment is recorded. An image processing algorithm ascertains in the overview image at least one boundary of an object that is not the sample itself. A focus setting is then ascertained at a location of at least one of the ascertained boundaries.

21 Claims, 4 Drawing Sheets

(51) Int. Cl.

| | |
|---|---|
| *G06T 7/12* | (2017.01) |
| *G06T 7/60* | (2017.01) |
| *G06T 7/73* | (2017.01) |
| *G06T 7/80* | (2017.01) |
| *H04N 23/67* | (2023.01) |
| *H04N 23/959* | (2023.01) |

(52) U.S. Cl.

CPC .............. *G06T 2207/20081* (2013.01); *G06T 2207/20092* (2013.01); *G06T 2207/20164* (2013.01); *G06T 2207/30168* (2013.01)

(56) References Cited

U.S. PATENT DOCUMENTS

| | | | | |
|---|---|---|---|---|
| 9,013,570 | B2 | 4/2015 | Matsunobu et al. | |
| 9,250,434 | B2 | 2/2016 | Morrin | |
| 2002/0088860 | A1* | 7/2002 | Entwistle | G06K 7/10722 |
| | | | | 235/462.45 |
| 2003/0118245 | A1* | 6/2003 | Yaroslavsky | G06T 1/0007 |
| | | | | 382/199 |
| 2004/0113043 | A1 | 6/2004 | Ishikawa et al. | |
| 2007/0031056 | A1* | 2/2007 | Perz | G02B 21/244 |
| | | | | 382/128 |
| 2009/0256058 | A1 | 10/2009 | Sato et al. | |
| 2012/0140055 | A1 | 6/2012 | Narusawa et al. | |
| 2012/0249770 | A1* | 10/2012 | Hamm | G02B 21/244 |
| | | | | 348/79 |
| 2013/0162804 | A1* | 6/2013 | Morrin | G02B 7/36 |
| | | | | 348/79 |
| 2013/0342673 | A1 | 12/2013 | Sticker et al. | |
| 2013/0342902 | A1* | 12/2013 | Krueger | G02B 21/245 |
| | | | | 359/383 |
| 2014/0267675 | A1 | 9/2014 | Matsunobu | |
| 2016/0252713 | A1* | 9/2016 | Corwin | G02B 21/365 |
| | | | | 348/80 |
| 2017/0023600 | A1* | 1/2017 | Kim | G01N 21/6428 |
| 2021/0090238 | A1* | 3/2021 | Gallagher-Gruber | |
| | | | | G01N 15/0625 |
| 2021/0278654 | A1* | 9/2021 | Gedraitis | G02B 21/36 |

FOREIGN PATENT DOCUMENTS

| | | | | |
|---|---|---|---|---|
| CN | 103080807 | A | 5/2013 | |
| CN | 108921161 | A | 11/2018 | |
| DE | 102005036529 | A1 * | 2/2007 | ......... G06K 9/00134 |
| DE | 102009041183 | A1 | 3/2011 | |
| DE | 102011003807 | A1 | 8/2012 | |
| EP | 0899541 | A2 | 3/1999 | |
| EP | 2402813 | A2 | 1/2012 | |
| EP | 2482111 | A1 | 8/2012 | |
| EP | 3291171 | A1 | 3/2018 | |
| JP | 2012123039 | A | 6/2012 | |

OTHER PUBLICATIONS

Chinese Application No. 202010407254.0, Office Action 1, Nov. 30, 2021, 19 pages (English translation provided).
Chinese Application No. 202010407254.0, Notification of Patent Grant, May 7, 2022, 6 pages (English translation provided).

* cited by examiner

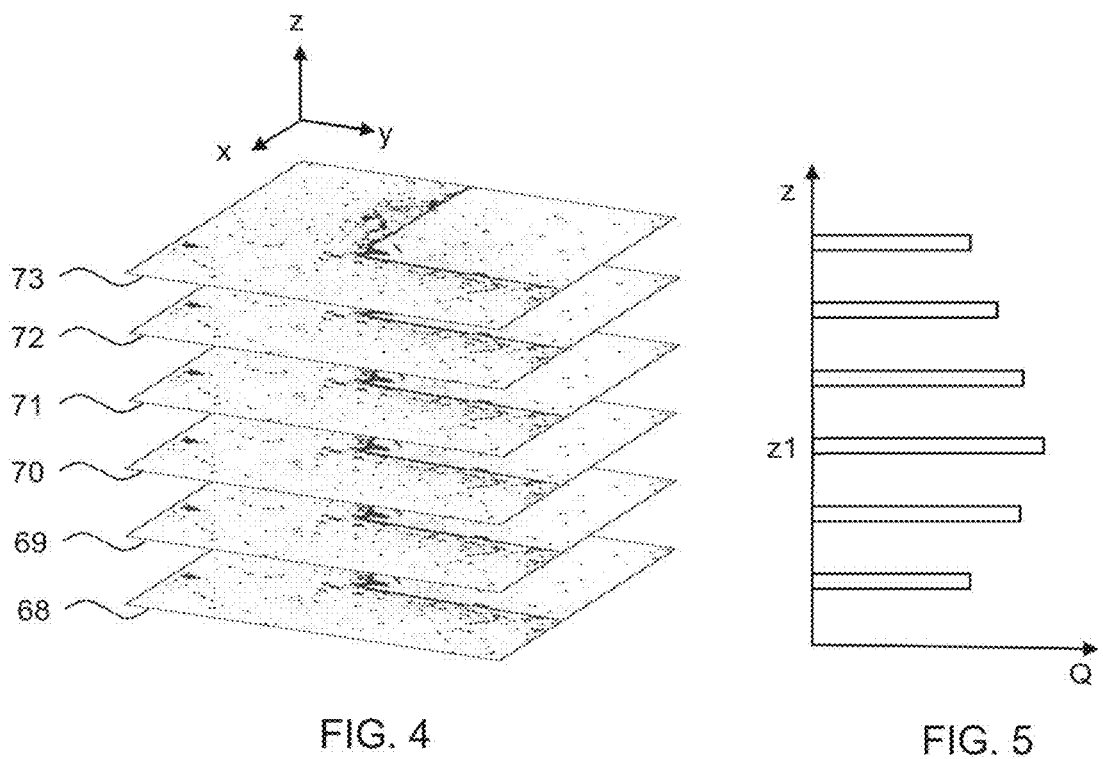
FIG. 4
FIG. 5
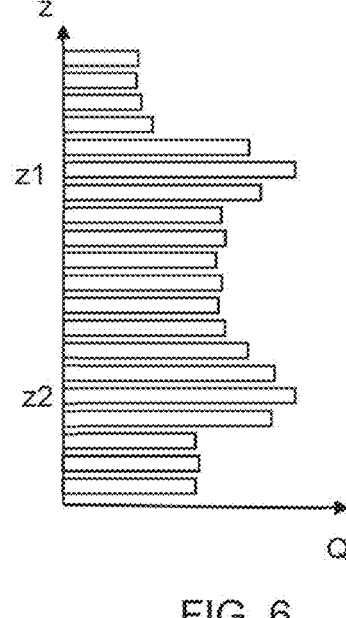
FIG. 6

LIGHT MICROSCOPE WITH AUTOMATIC FOCUSING

REFERENCE TO RELATED APPLICATIONS

The current application claims the benefit of German Patent Application No. 102019113540.0, filed on 21 May 2019, which is hereby incorporated by reference.

FIELD OF THE DISCLOSURE

The present invention relates to a light microscope with automatic focusing, to a method for automatic focusing of a light microscope and to a computer program product for performing the method.

BACKGROUND OF THE DISCLOSURE

Methods for the automatic focusing of a light microscope are becoming increasingly important, both for improving the convenience for a user, but also for automatically examining samples. Especially if a large number of samples, for example thousands of samples, need to be examined, no interventions on the part of a user should be necessary, if possible.

Different customary methods utilize sample-based auto-focusing based on the image sharpness. Here, the lateral coordinates of the sample position must be known so that meaningful focusing can take place. In addition, the sample in the contrast method used must be sufficiently visible, which can be problematic, depending on the sample. For example, fluorescent cells or bacteria might offer little contrast in overview images. Soiling, for example dust particles on cover slips, can also interfere with the autofocusing. Finally, the capture region can also be small depending on the sample, that is to say the height region, or z-region, in which an instantaneous focus setting must lie for correct focusing to take place.

In order to perform autofocusing that is less dependent on the concrete sample, projection-based methods are additionally used. In these methods, a specific pattern, such as a grid, is projected obliquely onto the bottom of a sample vessel or onto a microscope slide. The pattern is detected from the illumination direction using a camera. The z-position of the microscope slide can be calculated based on the position of the pattern in the recorded image. A disadvantage here is the special necessary hardware, which entails additional costs. A similar focusing method in which a separate autofocus beam path is used is described in DE 10 2011 003 807 A1.

It can be considered to be an object of the invention to specify a method, a computer program product and a light microscope, which are as independent of the sample as possible and make reliable automatic focusing of a light microscope possible in a way that is simple in terms of the apparatus that is involved.

SUMMARY OF THE DISCLOSURE

This object is achieved by the method having the features of claim 1, the computer program product of claim 20 and the light microscope having the features of claim 21. Variants of the invention are the subject of the dependent claims and will additionally be discussed in the following description.

In a method for automatic focusing of a light microscope, the invention makes provision for an image processing algorithm to ascertain in an overview image showing a sample and an environment at least one boundary of an object that is not the sample itself and for a focus setting to be ascertained/determined at a location of the ascertained boundary.

A computer program product according to the invention comprises instructions that, upon execution by a computing unit of a light microscope, cause the latter to perform the method described here. The invention additionally relates to a computer-readable data carrier on which the computer program product is stored.

A light microscope having automatic focusing comprises, according to the invention, an electronic control and evaluation device, which comprises an image processing algorithm that is designed to ascertain in an overview image showing a sample and an environment at least one boundary of an object that is not the sample itself. The electronic control and evaluation device is configured to ascertain a focus setting at a location of at least one ascertained boundary.

While the sample itself frequently effects a small image contrast and in this way causes difficulties for automatic image processing algorithms, the boundaries of other objects, for example a cover slip edge, can be more easily detected by image processing algorithms and then used for focusing. This focusing can also be referred to as coarse focusing because the ascertained focus position can deviate slightly from the z-position of the sample in dependence on the object type selected for focusing. For example, in the case of focusing at a cover slip edge, an inaccuracy could lie in the order of magnitude of the cover slip thickness. Therefore, the (coarse) focusing can optionally be followed by fine focusing on the sample. The focusing according to the invention is particularly robust with respect to soiling of the cover slip or of another sample vessel component. Conventional focusing methods that use sample structures directly for ascertaining the focus setting, by contrast, are more prone to mistaking dirt particles on the cover slip for sample structures, resulting in incorrect focusing.

Suitable boundaries that can be used are in particular edges or corners of components of the sample holder or of the sample vessel, for example a cover slip edge, a microscope slide edge or a periphery of a text or of a sticker on a microscope slide. After such a boundary has been identified, a focus setting is ascertained in which the boundary is imaged sharply onto the image sensor used.

The overview image can be recorded in a first method step or can already be present because of earlier measurements. It can differ from sample or microscope images that are to be recorded later, said images being recorded using or based on the ascertained focus setting, by the size of the field of view. In particular, a detail of the overview image can be recorded or scanned in magnified fashion by way of sample or microscope images, or the entire overview image is scanned. The overview image can be recorded optionally with an overview unit, which does not comprise the objective that is used later for recording the sample or microscope images.

Once a location of a boundary has been identified in the overview image, an actuating device can perform a relative movement between the sample and a detection beam path so that the detection beam path is directed at the ascertained location of the boundary. The relative movement can be a lateral movement perpendicular to the focus direction. Next, the focus setting can be ascertained. A calibration between the actuating device and coordinates of the overview image is provided here. For example, the actuating device can comprise a movable sample stage, so that coordinates of a boundary ascertained in the overview image are converted into sample stage coordinates. Alternatively, the desired relative movement can also be performed by way of for example a scanner (that is to say a light deflection device, in particular having movable mirrors or other optical elements) in the detection beam path. The recording of the overview image and the ascertaining of the focus setting at the boundary that has been identified in the overview image can be performed using different objectives.

For ascertaining boundaries between objects in the overview image, the image processing algorithm can comprise a segmentation or detection algorithm, which can be based in particular on a machine learning algorithm. A segmentation algorithm can perform segmentation of the overview image, in which each image point is assigned to one of a plurality of classes. The classes can correspond to the objects or even directly to boundaries between objects. Possible classes are, for example: "sample", "background", "microscope slide periphery" or "cover slip periphery". Similarly, a detection algorithm indicates coordinates of bounding boxes. Optionally, the detection algorithm can also be designed to indicate for the respective bounding boxes an object class, as mentioned above as examples.

Provision can also be made for the image processing algorithm to ascertain a plurality of boundaries in the overview image. Using predetermined criteria, which may in particular have been taught using a machine learning algorithm, one or more of the boundaries can be selected for the ascertaining of the focus setting. If a plurality of boundaries are selected, these can be zoomed in on successively and in each case a focus setting is ascertained for each one of the selected boundaries. A boundary can extend beyond the field of view that is used when recording microscope images for ascertaining the focus setting. In these cases, it is necessary to select one or more specific locations of the boundary that has been ascertained, that is to say boundary portions, in the overview image in an automated manner, which are then zoomed in on to ascertain the focus setting there.

If one or more locations of the ascertained boundary (or boundaries) are selected to then ascertain a focus setting there, the selection can be made based on a respective alignment of the boundary at these locations. In particular, the alignment of the boundary at these locations relative to an illumination direction can be considered in the subsequent ascertainment of the focus setting. Here, use is made of the fact that the contrast in images recorded for ascertaining the focus setting can depend significantly on the illumination direction relative to the bounding box. In darkfield measurements, the case may arise, for example, that two cover slip edges are approximately parallel to the illumination direction, whereas two other cover slip edges are approximately perpendicular to the illumination direction and are therefore easier to evaluate in microscope images which are recorded perpendicular to all cover slip edges.

In order to reliably detect boundaries that typically occur, these can be taught by way of a learning mode. For example, the boundaries can be edges of a rectangular, square or circular cover slip or sample vessel, wherein in particular the shape and size of typically occurring boundaries can be taught. The learning mode can comprise representing reference overview images of reference samples. The term "reference sample" is used to more clearly delineate the learning mode; the reference samples can in principle be any samples selected by the user. The user is then provided with a marking tool with which the user can mark one or more boundaries in each reference overview image. A machine learning algorithm of the image processing algorithm is trained therewith, that is to say it determines, based on the reference overview images and the boundaries marked by the user, criteria with which a boundary is ascertained for ascertaining the focus setting. In principle, it may also suffice in the learning mode if a user marks one or more boundaries in only one reference overview image, in particular if a learning process that took place previously (for example at the microscope manufacturer) is also taken into account.

The object whose boundary is ascertained can in particular be any sample vessel component/microscope slide component, for example a cover slip, a microscope slide, a chamber slide, a multiwell plate, a cell-culture tube or a cell-culture dish. Alternatively, the object can also be a sticker (for example a text field), a printed area or a mark on a microscope slide or on another sample vessel. The boundary ascertained in the overview image can now be or comprise an edge of such an object, in particular can thus be or comprise a cover slip edge, a microscope slide edge or a periphery of the sticker, of the printed area or of the mark.

If a plurality of edges and at least one corner of an object where two edges meet are ascertained in the overview image, the corner, for example a cover slip corner, is used in some invention variants as the location of the boundary of the object where the focus setting is ascertained. Alternatively, a location along the bounding box can also be selected by way of a random mechanism, which may be expedient for example in the case of circular cover slips.

The aforementioned boundaries or edges can always refer to the boundary with another object or material. By way of example, the stated objects can bound air, an immersion medium, another component of the sample vessel or the sample medium.

Ascertaining the focus setting may comprise the following steps of:
  recording a plurality of microscope images of different height focusing at the location of the ascertained boundary,
  determining a respective quality factor of the microscope images, in particular of a respective image sharpness quality factor,
  determining that microscope image or those microscope images having the maximum quality factor and
  establishing a focus setting based on the microscope image or microscope images having the maximum quality factor.

As was noted in the introductory part, the focus setting established in the manner described can be used either directly for recording sample images or can be changed by way of fine focusing (for example on sample structures) before sample images are recorded. It may also be the case that the cover slip edge is sharply discernible over the cover slip thickness. In this way, a plurality of images can have a substantially identical (image sharpness) quality factor. The focus setting can be established here based on the microscope images having a substantially identical quality factor, for example onto the region of the last one of these sharp microscope images which is located at the transition from the cover slip to the sample.

The image sharpness quality factor used can in particular be an image sharpness or an associated variable, for example a contrast or an edge number. A quality factor can also be ascertained by way of a machine learning algorithm. The machine learning algorithm calculates in each case a quality factor for the different microscope images based on the learned criteria. This quality factor can be linked with the image sharpness, wherein, however, the highest quality factor does not necessarily have to result in the case of the microscope image of maximum image sharpness. The ascertained focus setting can correspond exactly to the height focusing of the microscope image having the maximum quality factor. Alternatively, the focus setting can be selected merely in dependence thereon; for example, an offset can be added to the height focusing of the microscope image having the maximum image sharpness quality factor to establish the focus setting. The offset can be taught or prescribed and take into account for example an expected height offset between the boundary and the sample.

A maximum (image sharpness) quality factor or local maximum of the quality factor can refer to the fact that the microscope images that are adjacent thereto and in the case of which focusing is effected to a deeper or a less deep layer have a smaller quality factor.

A focus setting does not have to be established at exactly one of the height planes for which the microscope images were recorded. Rather, an interpolation to an intermediate value can be performed, that is to say to a height plane between the height planes for which the microscope images were recorded. Extrapolation is also possible, wherein the focus setting corresponds to a height plane that lies outside the height region covered by the plurality of microscope images. Owing to these procedures, two microscope images of different focusing can also already suffice.

In modified variants, only one single microscope image is recorded at the location of the ascertained boundary. A, or the, image processing algorithm, which can contain in particular a machine learning algorithm, can derive from said microscope image a focus setting that is used for later measurements. For example, a trained image processing algorithm can estimate from an image sharpness or another quality factor how much the current height setting deviates from a height setting with which structures visible in the microscope image would be imaged sharply onto the camera used for image recording.

Ascertaining a focus setting in the previously mentioned descriptions should be understood to mean ascertaining at least one focus setting. In particular it is also possible to ascertain two focus settings which correspond to two local sharpness maxima of the plurality of microscope images. The two maxima can be based on an upper side and a lower side of the object, for example the upper side and lower side of a cover slip.

Therefore, a cover slip thickness determination can also be effected as part of the ascertaining of the focus setting. To this end, a cover slip periphery is ascertained as a boundary of an object in the overview image. When determining the microscope images having a maximum (image sharpness) quality factor, two microscope images having a local maximum of the quality factor are ascertained. A cover slip thickness is ascertained for example from the difference between height values of these two microscope images. A height value is here intended to indicate a z-coordinate of the respectively focused detection plane for which a microscope image was recorded. Rather than the difference, a thickness determination can also more generally be effected from the profile of the (image sharpness) quality factor. In particular, first the height positions of the upper side and lower side of the cover slip can be estimated from the profile of the quality factor. These height positions do not need to exactly correspond to the height positions of the recorded microscope images but can be estimated in particular by way of interpolation or extrapolation. Next, the cover slip thickness can be calculated as the difference between the height positions of the upper side and lower side. Thicknesses of other objects can also be ascertained analogously. In one modification, the cover slip thickness can also be derived from an ascertained height value of the cover slip and an ascertained height value of a microscope slide boundary, in particular as a difference between these height values. If both a cover slip periphery and also a microscope slide periphery are visible in the same microscope image, it suffices if one or more microscope images, from which a height value of the cover slip periphery and the microscope slide periphery are estimated, are recorded at one location. Alternatively, it is also possible to successively zoom in on one location of a cover slip periphery and a location of a microscope slide periphery, wherein in each case one or more microscope images are recorded at both locations for the height determination of the respective periphery.

It is also possible to ascertain a microscope slide inclination as part of the ascertainment of the focus setting. To this end, at least three locations of a boundary are ascertained in the overview image. At these locations (that is to say lateral positions that can be defined by x-y-coordinates), in each case a focus setting therefor is ascertained that indicates a height position, that is to say the z-coordinate, of the respective location. A microscope slide inclination is then ascertained based on the at least three height positions, for example by placing a plane through the three ascertained points. In principle, a piece of inclination information can also be acquired via a comparison of the height positions to two laterally offset locations. In this way, for example classification after correct or incorrect sample arrangement is possible.

The boundaries whose height positions are ascertained for determining the microscope slide inclination could be chosen such that the sample is located laterally between the locations of these boundaries. This is for example the case if opposite edges of a cover slip are used for ascertaining the focus settings. Hereby, more precise statements with respect to the sample location can be made. In addition, the locations of the selected boundaries are thus located relatively far away from one another, which is beneficial to the accuracy of the inclination determination, which increases as the lateral distances of the locations of the selected boundaries increase.

The number of boundaries used for determining the microscope slide inclination can be selected in dependence on a lateral distance between these boundaries. In particular the number selected can be greater, the smaller the lateral distances between the locations of the selected boundaries are.

The ascertained microscope slide inclination can now be taken into consideration for a focus setting in subsequent sample examinations. For different lateral positions of the sample, a respective focus setting can thus be adjusted in accordance with the microscope slide inclination. In this way, automatic tile recording with a stable focus is possible, that is to say images of a plurality of sample details which are offset relative to one another parallel to the microscope slide are recorded. If the sample image recording takes place by way of a scan, the ascertained microscope slide inclination can be used to also adjust the z-coordinate of the focus in dependence on the x-y-coordinate of the instantaneous scanning position.

It is also possible to establish an orientation alignment as part of the ascertainment of the focus setting. The orientation alignment indicates whether a sample vessel was arranged the wrong way around. In particular in the case of a microscope slide with a cover slip the case may arise that a user places it the wrong way around. It is therefore desirable to automatically ascertain on which side of the microscope slide the cover slip is located. In this respect, the image processing algorithm initially ascertains in the overview image a location of a cover slip periphery and a boundary of a microscope slide (for example a microscope slide periphery or the boundary of the microscope slide with another object, such as a sticker or a text on the microscope slide). A focus setting and thus a height position is now ascertained in each case for the boundary of the cover slip and of the microscope slide. Using a comparison of the height positions of the boundaries of the cover slip and of the microscope slide, it is ascertained whether the cover slip is located above or below the microscope slide.

The ascertained microscope slide inclination can also be taken into consideration for ascertaining the orientation alignment. In particular, a height offset that is based on the microscope slide inclination can be calculated for the height positions that are to be compared. In this way, it is possible to avoid that an inclined microscope slide is incorrectly confused with a microscope slide that has been placed the wrong way around.

If a microscope slide with a cover slip is used, it is possible for more precise focusing to use the knowledge that the z-positions of the microscope slide and of the cover slip define an upper boundary and a lower boundary between which the sample is located. Initially, at least one cover slip periphery and one microscope slide boundary can be ascertained as boundaries in the overview image. The microscope slide boundary can be for example a microscope slide periphery or the boundary between the microscope slide and a sticker or a text. Next, in each case a focus setting and thus a height position for the cover slip periphery and the microscope slide boundary are ascertained. A focus setting for subsequent sample examinations is now set to a height position between the ascertained height positions of the cover slip periphery and the microscope slide boundary.

The term "cover slip" is intended to be defined by its function as a cover of the sample, but not by the material selection. In particular, a cover slip can consist of a plastic or a glass. A focus setting designates the z-position or height position of a detection plane, which is imaged sharply by the light microscope onto an image sensor of the light microscope, relative to the sample. Different focus settings accordingly differ in terms of the z-position of the focus relative to the sample.

The properties of the invention described as additional apparatus features also yield variants of the method according to the invention when used as intended. Conversely, the light microscope according to the invention can also be configured to carry out the described method variants. In particular, the control and evaluation device can be configured to perform the method steps described or to drive the corresponding microscope components to do so, that is to say for example to drive components to perform focus adjustment, a lateral sample displacement, an objective exchange or image recording. The method described can also be part of a focusing method in which, in dependence on sample structures detected in the overview image, the focus setting is ascertained either on the sample structures or as described above.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components:

FIG. 4 shows a stack of microscope images of different focusing;

FIG. 5 shows the respective image sharpness quality factor for the microscope images from FIG. 4;

FIG. 6 shows the respective image sharpness quality factor for a multiplicity of microscope images of different focusing and FIG. 7 shows an overview image of a multiwell plate.

Identical and identically acting constituent parts are generally identified by the same reference signs in the figures.

DETAILED DESCRIPTION OF EMBODIMENTS

Figure 1:
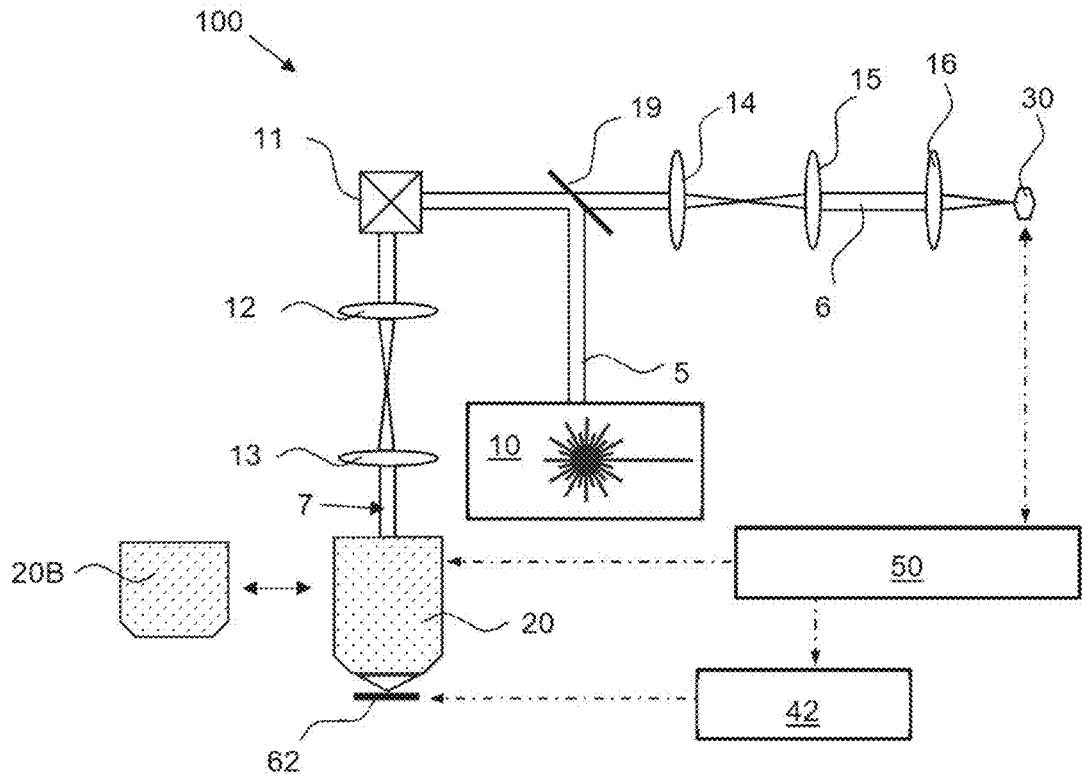
FIG. 1 shows an exemplary embodiment of a light microscope according to the invention.

FIG. 1 illustrates an exemplary embodiment of a light microscope 100 according to the invention. The light microscope 100 comprises a light source 10 for emitting illumination light 5. The light source 10 can comprise for example one or more laser or LED units. The illumination light 5 is guided via optics elements 11-13 to a sample region, in which a sample 62 can be arranged. Detection light 6 coming from the sample 62 travels along a detection beam path 7 and is guided via optics elements 11-16 onto an image sensor 30. Depending on the design of the light microscope 100, the detection light 6 can be, for example, one or more of the following:

illumination light scattered at the sample 62 or in the sample region, in particular in the case of dark-field microscopy, fluorescence light emitted by the sample 62 or in the sample region, illumination light that is phase-modulated by the sample 62 or in the sample region and produces a phase contrast image by way of a phase contrast method, or transmitted illumination light that was transmitted through the sample 62 or through the sample region, wherein light that is absorbed or scattered by the sample 62 or in the sample region appears dark in the recorded image, as in particular in the case of bright-field microscopy.

In the light microscope 100 shown, measurement is effected in reflected light, that is to say both illumination light 5 and detection light 6 travel in part via the same optics elements 11-13, wherein a beam splitter 19, for example a colour or polarization beam splitter 19, is arranged in the common beam path. The beam splitter 19 in the example shown is transmissive for detection light 6 and reflective for illumination light 5, although this may also be designed to be the other way around. In the example depicted, the illumination light 5 and the detection light 6 also travel via the same objective 20 or 20B, although the invention is not limited to such designs. In other designs according to the invention, measurements are not performed in reflected light and the illumination light 5 and detection light 6 do not travel via the same optics elements or the same objective.

First, an overview image of the sample 62 is recorded using the light microscope 100. One or more suitable locations at which focusing takes place are ascertained using the overview image. Next, sample images with a larger imaging scale (magnification) than the overview image can be recorded. The recording of the overview image and subsequent measurements can be effected with different objectives 20, 20B. Depending on the setup, the same image sensor 30 or different image sensors can be used for the recording of the overview image and for subsequent measurements for ascertaining a focus setting or for recording sample images.

The invention makes automatic focusing possible, wherein the necessary calculation and control steps are performed by an electronic control and evaluation device 50. The control and evaluation device 50 is configured to evaluate image data of the image sensor 30, change focusing of the light microscope and set a lateral position of the sample 62. For setting the lateral position of the sample 62, the control and evaluation device 50 controls for example an actuation device 42, which can comprise in particular a movable sample stage. Alternatively, a scanner can also be driven by the control and evaluation device 50 to scan a specific lateral region. A lateral position designates the position of the sample 62 perpendicular to the detection axis, that is to say to the direction of the detection beam path in which it is incident on the sample 62. The focusing is effected in the direction of the detection axis, which is also referred to as the z-direction. The lateral position is consequently defined by x-y-coordinates. Different focus settings differ in the relative z-position between the sample 62 and the detection plane that is sharply imaged via the objective 20 or 20B and optics elements 11-16 onto the image sensor 30. For changing the focusing, the control and evaluation device 50 can adjust the sample 62 itself in the z-direction, in particular via a movable sample stage. Alternatively, a zoom optical unit can be present and be driven by the control and evaluation device 50 such that the zoom optical unit effects a focus adjustment. The zoom optical unit can be formed in the objective 20, 20B or separately herefrom.

The automatic focusing will now be described in more detail with reference to FIGS. 2 to 5.

Figure 2:
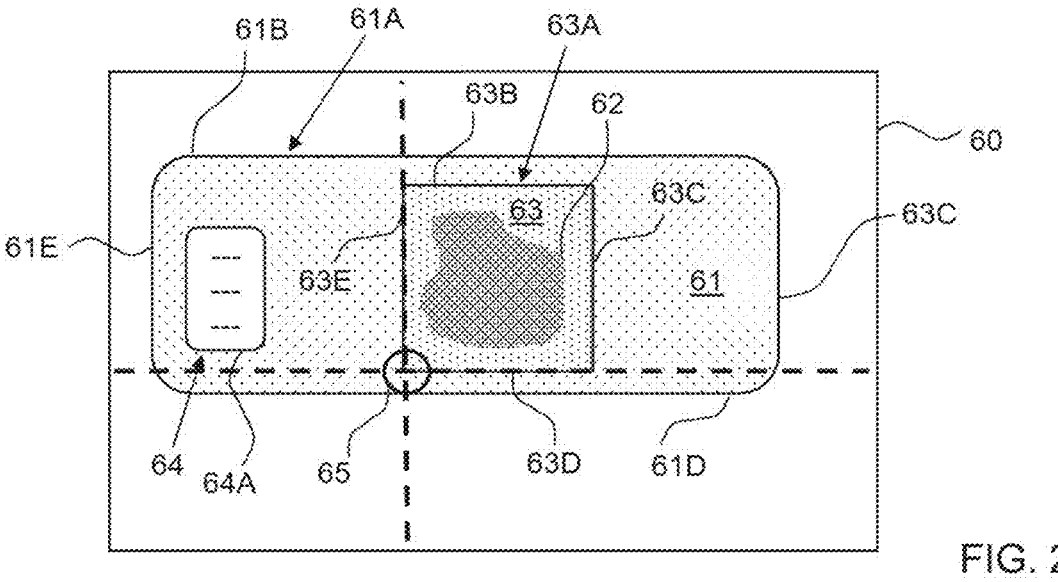
FIG. 2 shows an overview image recorded using the light microscope of FIG. 1.

FIG. 2 shows an overview image 60, which was recorded by the light microscope 100 with a sufficiently large field of view, so that not only the sample 62, but also an environment of the sample 62 was imaged onto the image sensor. The environment comprises a sample vessel or parts thereof. In the example illustrated, the sample 62 is located between a microscope slide 61 and a cover slip 63 arranged thereon. Under certain circumstances, the sample 62 produces little contrast in recorded images; finding a focus setting with which the sample 62 is imaged sharply onto the image sensor solely based on the sample 62 can be difficult.

The invention uses the knowledge that other structures, however, in particular edges of objects that are not the sample themselves are frequently significantly easier to see, can be detected more easily in automated fashion and are suitable due to a large capture region to ascertain a focus setting. To this end, an image processing algorithm that is part of the control and evaluation device 50 first ascertains a boundary of an object. In the example illustrated, the object is the cover slip 63 and the boundary 63A of the cover slip 63 is formed by the edges 63B to 63E thereof.

The image processing algorithm can comprise a segmentation algorithm or detection algorithm to identify the bounding box. In this case, a machine learning algorithm that was trained previously for this type of objects can be used. The knowledge that frequently uniformly and regularly shaped objects are used, independently of the specific sample, is utilized. For example, cover slips are generally rectangular or circular. The size of the cover slip can also be trained easily if a multiplicity of measurements are performed on different samples having cover slips of the same type (or on the same sample). For training the image processing algorithm for finding a bounding box, the following factors can be considered: The boundary forms a symmetric shape, for example a rectangle, square, circle or, in particular in the case of arrangement inaccuracies, a parallelogram, trapezium or an ellipse. Depending on the field of view recorded with the overview image 60, the object is additionally visible in its entirety, with the result that the bounding box forms a closed shape.

In the example illustrated, the image processing algorithm ascertains the boundary 63A, that is to say the periphery of the cover slip 63. A location 65 of the cover slip boundary 63A is now used for a subsequent ascertainment of a focus setting. The location 65 designates a region of the boundary 63A, for example part of a cover slip edge 63B-63E or, as in the example illustrated, a cover slip corner where two cover slip edges 63D, 63E meet.

Figures 3A, 3B:
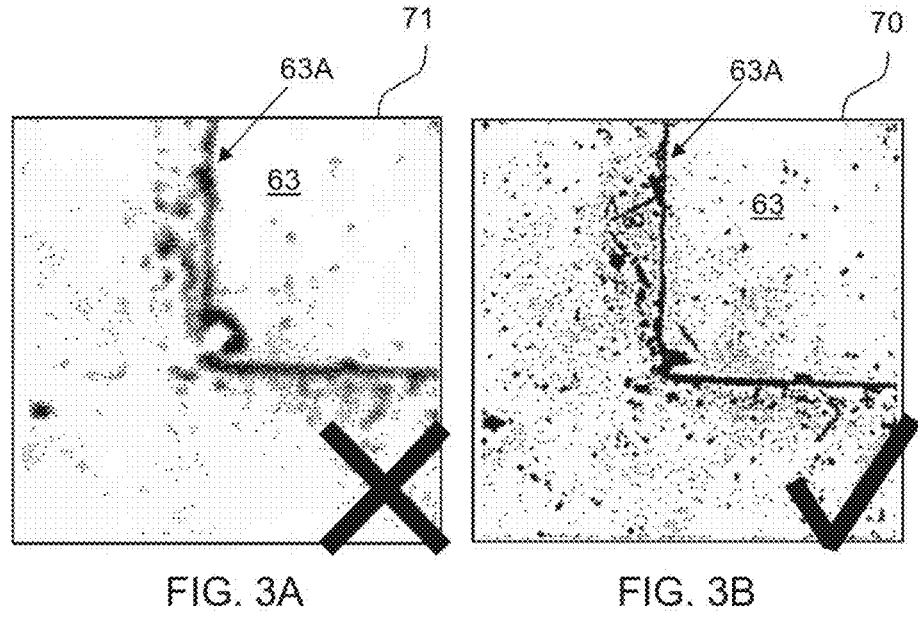
FIG. 3A, FIG. 3B show microscope images of different focusing, which are recorded using the light microscope of FIG. 1.

The control and evaluation device now moves the sample stage such that the detection beam path is centred onto the location 65. In principle, such a lateral movement between the sample and detection beam path can also be effected in a different way. Subsequently, a plurality of images (below: microscope images) that differ in the z-focusing are recorded at greater magnification than in the overview image. To set different focusing, the control and evaluation device changes either the z-position of the sample or the z-position of the detection focus, as described above. Two such microscope images 70 and 71, which were recorded with different focusing, are shown in FIGS. 3A and 3B. A stack of such microscope images 68-73 is shown in FIG. 4. In the microscope images 68-73, the, or a further, image processing algorithm determines a quality factor for the image sharpness, that is to say for example the sharpness itself or an associated variable. In the example illustrated, the microscope image 70 has the highest image sharpness of all microscope images recorded. This is illustrated in FIG. 5, which shows the image sharpness quality factor Q for the microscope images that are offset in the z-direction. The focus setting with which the sharpest microscope image 70 was recorded has a focusing onto a plane with the z-value z1 in FIG. 5. This focus setting or a focus setting derived herefrom is used for subsequent processes.

For example, different sample images can be recorded with the focus setting thus ascertained. For a clearer definition of terminology, sample images are intended to designate recordings of the image sensor that are directed at the sample 62 itself rather than to the periphery of an object (cover slip 63), which is not the sample itself, like the aforementioned microscope images 70, 71. With this terminology as defined, the microscope images recorded for focus ascertainment differ from the sample images in their x-y-positions.

Alternatively, the focus setting thus ascertained can also be considered to be a coarse focus setting and be used for subsequent fine focusing before sample images are recorded. After all, owing to for example the cover slip thickness, a slight deviation between the detection plane and the z-position of the sample can be present in the ascertained focus setting. The accuracy can lie for example in the range of typical cover slip thicknesses of approximately 20 μm. In the fine focusing, the detection beam path can be directed in particular at the sample 62 itself and then images can be recorded with different fine focus settings that lie around the previously ascertained (coarse) focus setting. Next, the fine focus setting for which the recorded image has the greatest quality factor is ascertained and used for the subsequent sample recordings.

Automated focusing can be reliably performed in the manner described. Advantageously, the capture range is large, i.e., the range of different z-focus settings from which a focus adjustment to a sharply imaging focus setting can be determined.

In FIG. 2, a single location 65 of the cover slip periphery 63A was selected to ascertain a focus setting in the manner described. However, different locations of the cover slip periphery 63A, for example different cover slip corners or cover slip edges 63B-63E can also be zoomed in on successively in the manner described above and be used in each case to ascertain a focus setting. The accuracy can be increased if a focus setting is ascertained at a plurality of locations. In addition, a microscope slide inclination can be ascertained hereby. If a respective focus setting is ascertained for example at three or more locations of the cover slip periphery 63A, an associated z-position or height position of the cover slip periphery 63A is ascertained for each of said locations (that is to say for each of said x-y-positions of the cover slip periphery 63A). The cover slip 63 or the interface thereof is assumed to be a plane. Therefore, the location and/or inclination of the cover slip can be ascertained from the three x-y-z-coordinates of the cover slip periphery 63A. The microscope slide can be described by a plane lying parallel to the cover slip, as a result of which the inclination of the microscope slide can be assumed to be identical to the inclination of the cover slip.

In the above examples, the cover slip periphery 63A is detected by the image processing algorithm as the boundary of the object that is not the sample 62 itself. However, the image processing algorithm can also be designed to additionally or alternatively determine other bounding boxes. For example, it can identify the microscope slide periphery 61A in the overview image 60 and select a portion of one of the edges 61B-61E or one of the corners of the microscope slide 61 as the location of the microscope slide periphery 61A for the subsequent ascertainment of the focus setting.

In further alternatives, other bounding boxes are selected, for example the periphery 64A of a sticker or printed area 64 on the microscope slide 61. However, it is not necessarily known in this case whether the sticker/printed area 64 is located on the sample side of the microscope slide 61 or on the opposite side of the microscope slide 61.

Figure 7:
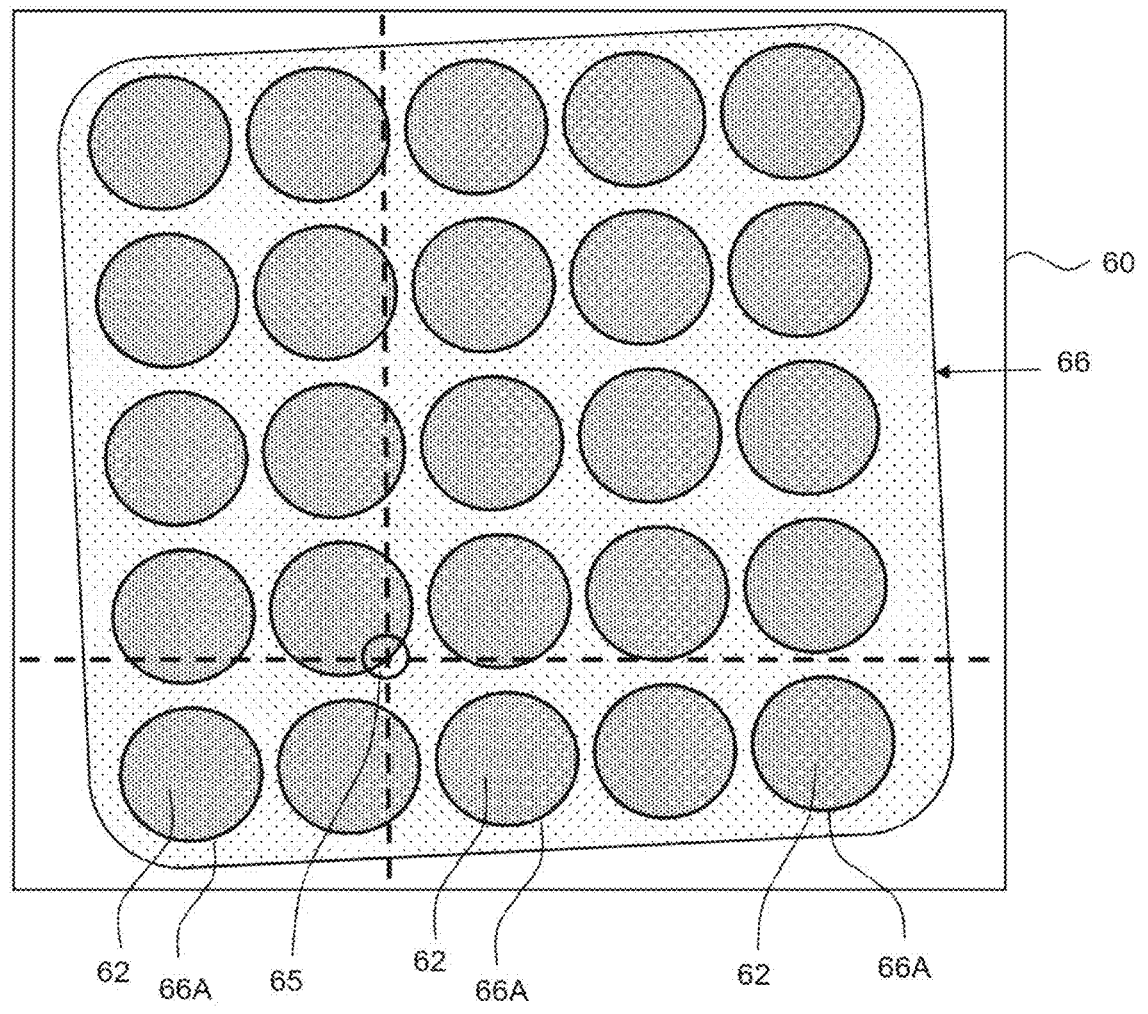

In further embodiment variants, other sample vessels are used, for example a multiwell plate. FIG. 7 schematically illustrates an overview image 60, in which a multiwell plate 66 with a plurality of samples 62 in respective wells (depressions) is arranged. The well peripheries 66A are easily visible. Analogously to the above description, it is also possible in this case to identify the well peripheries 66A as boundaries and use them for ascertaining the focus setting.

In one invention variant, the cover slip thickness is additionally determined. In this case, a stack of microscope images 68-73 is recorded at a location of a boundary of the cover slip, as shown in FIG. 4. If the z-region that is passed through here covers both the upper edge and the lower edge of the cover slip, there may be two maxima in the z-dependent profile of the image sharpness quality factor, as shown in FIG. 6. The difference between these two z-values z1 and z2 is a measure of the cover slip thickness.

The invention thus makes reliable automated focusing possible, wherein as part of the ascertainment of a suitable focus setting, additional measurement results are also optionally obtained, for example relating to the cover slip thickness, microscope slide inclination or microscope slide orientation. It is not necessary for focusing that the sample is clearly visible. The computer program product according to the invention can also be realized with conventional light microscopes, that is to say no additional hardware is absolutely necessary in the case of such light microscopes.

LIST OF REFERENCE SIGNS

5 Illumination light
6 Detection light
7 Detection beam path
10 Light source
11-16 Optics elements
19 Beam splitter
20 Objective with which a focus setting is ascertained
20B Objective with which an overview image is recorded
30 Image sensor
42 Actuating device for moving the sample
50 Control and evaluation device
60 Overview image
61 Microscope slide
61A Boundary/periphery of the microscope slide
61B-61E Edges of the microscope slide 61
62 Sample
63 Cover slip
63A Boundary/periphery of the cover slip
63B-63E Edges of the cover slip 63
64 Sticker/printed area on the microscope slide 61
64A Boundary/periphery between sticker/printed area 64 and microscope slide 61
Site of the boundary for ascertaining the focus setting
66 Multiwell plate
66A Well peripheries of the multiwell plate 66 68-73 Microscope images with different z-focusing
100 Light microscope
Q Image sharpness quality factor of the microscope images 68-73

We claim:

1. A method for automatically focusing a microscope, comprising:
an initial coarse focusing in which a coarse focus setting is determined, followed by a subsequent fine focusing in which a fine focus setting is determined based on the coarse focus setting,
the initial coarse focusing comprising:
determining the coarse focus setting at a lateral xy-location of a lateral edge or corner of a cover slip, a microscope slide, a well of a multiwell plate, or a sample vessel assessed as a best-suited lateral xy-location for a focus determination based on predetermined criteria out of a plurality of assessed lateral xy-locations of lateral edges or corners of the cover slip, the microscope slide, the well of the multiwell plate, or the sample vessel in an overview image, wherein the coarse focus setting is determined at the best-suited lateral xy-location identified in the overview image;
the subsequent fine focusing comprising:
determining the fine focus setting at the sample by recording image data at the sample with the coarse focus setting and modifying the coarse focus setting to enhance image sharpness; and
after determining the fine focus setting, recording at least one sample image using the fine focus setting.

2. The method of claim 1,
wherein an actuating device performs a relative movement between the sample and a detection beam path with the result that the detection beam path is directed at the best-suited lateral xy-location, and subsequently the coarse focus setting is determined.

3. The method of claim 1,
wherein the initial coarse focusing uses a segmentation algorithm or detection algorithm via which boundaries of objects are ascertained in the overview image, wherein the segmentation algorithm or detection algorithm is based on a machine learning algorithm.

4. The method of claim 1,
wherein a position of one of a plurality of boundary portions is selected as the best-suited lateral xy-location, in dependence on an alignment of the respective boundary portion relative to an illumination direction used in the subsequent determination of the coarse focus setting.

5. The method of claim 1, further comprising
providing a learning mode to a user, in which:
reference overview images of reference samples are represented,
a marking tool is provided for the user with which the user can mark one or more lateral edges in each reference overview image,
a machine learning algorithm establishes, based on the reference overview images and the boundaries marked by the user, criteria with which the best-suited lateral xy-location is ascertained for determining the coarse focus setting.

6. The method of claim 1,
wherein a plurality of lateral xy-locations of a plurality of edges and at least one corner are ascertained in the overview image, and the at least one corner is used as the location where the coarse focus setting is determined.

7. The method of claim 1,
wherein the initial coarse focusing includes ascertaining boundaries of at least two objects that are not the sample itself in the overview image, wherein at least one of the at least two objects is a sticker, a printed area or a mark on a microscope slide, and the boundary of the at least one of the at least two objects is or comprises a periphery of the sticker, of the printed area or of the mark.

8. The method of claim 1,
wherein determining the coarse focus setting comprises at least:
recording a plurality of microscope images of different height focusing at the best-suited lateral xy-location;
determining a respective image sharpness quality factor of the microscope images;
determining that microscope image or those microscope images having the maximum image sharpness quality factor;
establishing the coarse focus setting based on the microscope image/microscope images having the maximum image sharpness quality factor.

9. The method of claim 8,
wherein, as part of the determination of the coarse focus setting, a cover slip thickness is also determined, wherein a lateral cover slip edge is ascertained in the overview image,
wherein during the determination of the microscope images with a maximum image sharpness quality factor, two microscope images with a local maximum in the image sharpness quality factor are ascertained, wherein a cover slip thickness is ascertained from a difference between height values of the two microscope images.

10. The method of claim 1,
wherein as part of the determination of the coarse focus setting, a microscope slide inclination is also ascertained, wherein at least three locations of a boundary are ascertained on which then in each case a local focus setting that indicates a height position of the respective location is ascertained,
wherein the microscope slide inclination is ascertained based on the at least three height positions.

11. The method of claim 10, further comprising
selecting the locations of the boundary that are used for ascertaining the microscope slide inclination such that the sample is located laterally between these locations of the boundary.

12. The method of claim 10,
wherein the number of locations of the boundary used for determining the microscope slide inclination is selected in dependence on a lateral distance between said locations.

13. The method of claim 10, further comprising
using the ascertained microscope slide inclination for the fine focus setting in subsequent sample examinations, wherein for different lateral positions of the sample a respective fine focus setting is adjusted in accordance with the microscope slide inclination.

14. The method of claim 1,
wherein, as part of the determination of the coarse focus setting, an orientation alignment is ascertained by
ascertaining in the overview image at least one cover slip periphery and one microscope slide boundary as boundaries,
ascertaining the coarse focus setting and thus a height position in each case for the cover slip periphery and the microscope slide boundary,
ascertaining, using a comparison of the height positions of the cover slip periphery and of the microscope slide boundary, whether the cover slip is located above or below the microscope slide.

15. The method of claim 14,
wherein the ascertained microscope slide inclination is taken into account for the ascertainment of the orientation alignment by calculating a height offset based on the microscope slide inclination for the height positions to be compared.

16. The method of claim 1, further comprising
ascertaining at least one cover slip periphery and one microscope slide boundary as boundaries in the overview image,
determining a focus setting and thus a height position in each case for the cover slip periphery and the microscope slide boundary, and
setting the coarse focus setting for subsequent sample examinations to a height position, wherein the height position is between the determined height positions of the cover slip periphery and the microscope slide boundary.

17. A computer program product comprising instructions that, upon execution by a computing unit of a light microscope, cause the latter to carry out the method of claim 1.

18. A light microscope with automatic focusing, comprising:

an electronic control and evaluation device, which is configured to perform an initial coarse focusing in which a coarse focus setting is determined, followed by a subsequent fine focusing in which a fine focus setting is determined based on the coarse focus setting;

wherein the electronic control and evaluation device is configured to:

determine the coarse focus setting at a lateral xy-location of a lateral edge or corner of one of: a cover slip, a microscope slide, a well of a multi-well plate, or a sample vessel assessed as a best-suited lateral xy-location for a focus determination based on predetermined criteria out of a plurality of assessed lateral xy-locations of lateral edges or corners of the cover slip, the microwave slide, the well of the multiwell plate, or the sample vessel in an overview image, wherein the coarse focus setting is determined at the best-suited lateral xy-location identified in the overview image;

determine the fine focus setting at the sample by recording image data at the sample with the coarse focus setting and modifying the coarse focus setting to enhance image sharpness; and after determination of the fine focus setting, record at least one sample image using the fine focus setting.

19. The light microscope of claim 18, wherein, as part of the determination of the coarse focus setting, the electronic control and evaluation device is configured to ascertain a microscope slide inclination, wherein at least three locations of a boundary are ascertained on which then in each case a local focus setting that indicates a height position of the respective location is ascertained, and wherein the microscope slide inclination is ascertained based on the at least three height positions.

20. A method for automatically focusing a microscope, comprising:

an initial coarse focusing in which a coarse focus setting is determined, followed by a subsequent fine focusing in which a fine focus setting is determined based on the coarse focus setting, the initial coarse focusing comprising:

determining the coarse focus setting at a lateral xy-location of a text or an edge or corner of a text field on a microscope slide or sample vessel assessed as best-suited for a focus determination based on pre-determined criteria out of a plurality of assessed lateral xy-locations of text or lateral edges or corners of the text field on the microscope slide or the sample vessel in an overview image, wherein the coarse focus setting is determined at the best-suited lateral xy-location identified in the overview image;

the subsequent fine focusing comprising:

determining the fine focus setting at the sample by recording image data at the sample with the coarse focus setting and modifying the coarse focus setting to enhance image sharpness; and after determination of the fine focus setting, recording sample images at xy-locations of the sample using the fine focus setting.

21. A method for automatically focusing a microscope, comprising:

an initial coarse focusing in which a coarse focus setting is determined at an xy-location outside a sample, followed by a subsequent fine focusing in which a fine focus setting is determined at the sample based on the coarse focus setting, the initial coarse focusing comprising:

analyzing an overview image showing the sample and an environment to ascertain a plurality of lateral xy-locations of a lateral edge or corner of one of: a cover slip, a microscope slide, a well of a multiwell plate, a sample holder, a sample vessel, or another barrier which physically limits a specimen area;

determining, for each lateral xy-location of the plurality of lateral xy-locations, a suitability for determination of the coarse focus setting based on predetermined criteria;

selecting at least one best-suited lateral xy-location out of the plurality of lateral xy-locations, wherein the at least one best-suited lateral xy-location identifies a part of the overview image which is laterally distanced from the sample; and determining the coarse focus setting at the selected at least one best-suited lateral xy-location of the lateral edge or corner of the cover slip, microscope slide, well, sample holder, sample vessel, or the another barrier which physically limits the specimen area, while disregarding other regions recorded in the overview image for the determining of the coarse focus setting;

the subsequent fine focusing comprising:

determining the fine focus setting at the sample by recording image data at the sample with the coarse focus setting and modifying the coarse focus setting to enhance image sharpness; and recording at least one sample image with the fine focus setting; and providing a learning mode to a user, in which:

reference overview images of reference samples are represented, a marking tool is provided for the user with which the user can mark one or more lateral edges in each reference overview image, a machine learning algorithm establishes, based on the reference overview images and the boundaries marked by the user, criteria with which the at least one best-suited lateral xy-location of the lateral edge or corner is ascertained for determining the coarse focus setting; and wherein as part of the determination of the coarse focus setting, a microscope slide inclination is also ascertained, wherein at least three locations of a boundary are ascertained on which then in each case a local focus setting that indicates a height position of the respective location is ascertained, wherein the microscope slide inclination is ascertained based on the at least three height positions.

* * * * *